United States Patent
Russo et al.

(10) Patent No.: US 11,080,955 B2
(45) Date of Patent: Aug. 3, 2021

(54) DEVICE, SYSTEM AND METHOD FOR CONTROLLING A PASSAGE BARRIER MECHANISM

(71) Applicant: MOTOROLA SOLUTIONS, INC., Chicago, IL (US)

(72) Inventors: Pietro Russo, Melrose, MA (US); Eric Johnson, Chicago, IL (US); Daniel R. Bestor, Schaumburg, IL (US); Hao Zeng, Long Grove, IL (US); Trent J. Miller, Chicago, IL (US); Azamat Sarkytbayev, Boston, MA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 68 days.

(21) Appl. No.: 16/563,146

(22) Filed: Sep. 6, 2019

(65) Prior Publication Data

US 2021/0074097 A1    Mar. 11, 2021

(51) Int. Cl.
*G07C 9/00* (2020.01)
*G07C 9/37* (2020.01)
(Continued)

(52) U.S. Cl.
CPC ......... *G07C 9/00563* (2013.01); *G06F 9/542* (2013.01); *G06F 21/32* (2013.01);
(Continued)

(58) Field of Classification Search
CPC .. G07C 9/00563; G07C 9/37; G07C 9/00182; G07C 2009/00198; G06F 9/542; G06F 21/32
See application file for complete search history.

(56) References Cited

U.S. PATENT DOCUMENTS 6,422,463 B1   7/2002  Flink
6,714,665 B1   3/2004  Hanna et al.
(Continued)

FOREIGN PATENT DOCUMENTS

CA        2481250 A1     10/2003
WO     2005024732 A1      9/2004
WO   WO-2018025086 A1     2/2018

OTHER PUBLICATIONS

PCT/US2020/044152, Device, System and Method for Controlling a Passage Barrier Mechanism, filed Jul. 30, 2020.

*Primary Examiner* — Nabil H Syed
(74) *Attorney, Agent, or Firm* — Perry + Currier, Inc.

(57) ABSTRACT

A device, system and method for controlling a passage barrier mechanism is provided. While failing to detect, via a biometric imaging system in communication with a passage barrier mechanism, unauthorized users in a first area of interest of the biometric imaging system, a device: maintains the passage barrier mechanism in a multiple entry state in which multiple users at a time authenticate, via the biometric imaging system, and enter therethrough. Responsive to detecting, via the biometric imaging system, an unauthorized user in the first area of interest, the device: transitions the passage barrier mechanism from the multiple entry state to a single entry state in which only a single user at a time authenticates, via the biometric imaging system, and enters therethrough; and changes a biometric authentication range of the biometric imaging system from the first area of interest to a smaller second area of interest.

18 Claims, 5 Drawing Sheets

(51) Int. Cl.
*G06F 9/54* (2006.01)
*G06F 21/32* (2013.01)

(52) U.S. Cl.
CPC ........... *G07C 9/00182* (2013.01); *G07C 9/37* (2020.01); *G07C 2009/00198* (2013.01)

(56) References Cited

U.S. PATENT DOCUMENTS

| | | | |
|---|---|---|---|
| 9,865,144 B2 | 1/2018 | Trani | |
| 9,986,293 B2 | 5/2018 | Hildreth | |
| 10,186,124 B1 | 1/2019 | Mullins | |
| 2005/0219360 A1 | 10/2005 | Cusack et al. | |
| 2007/0242860 A1* | 10/2007 | Hasebe | G06K 9/00255 |
| | | | 382/118 |
| 2014/0192197 A1 | 7/2014 | Hanko et al. | |
| 2016/0284183 A1 | 9/2016 | Trani | |
| 2017/0103265 A1* | 4/2017 | Channah | G06K 9/00838 |
| 2018/0181776 A1 | 6/2018 | Lim et al. | |
| 2019/0108697 A1* | 4/2019 | Haidacher | G07C 9/00563 |
| 2019/0147676 A1* | 5/2019 | Madzhunkov | G06K 9/00214 |
| | | | 340/5.2 |
| 2019/0172281 A1* | 6/2019 | Einberg | G06K 9/00255 |
| 2019/0278927 A1* | 9/2019 | Konishi | G06F 21/32 |
| 2020/0118375 A1* | 4/2020 | Tagawa | E06B 11/02 |

\* cited by examiner

DEVICE, SYSTEM AND METHOD FOR CONTROLLING A PASSAGE BARRIER MECHANISM

BACKGROUND OF THE INVENTION

At controlled-access points, passage barrier mechanisms may be maintained in a closed and locked state, and a user must positively swipe in, for example using an access card, wait for authentication to occur, wait for the mechanical lock to unlock, and then proceed through the controlled access point once authenticated. However, such mechanisms have low user throughput and further have problems with tailgating, in which users pass through the passage barrier mechanism following an authenticated user and without, themselves, being authenticated.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
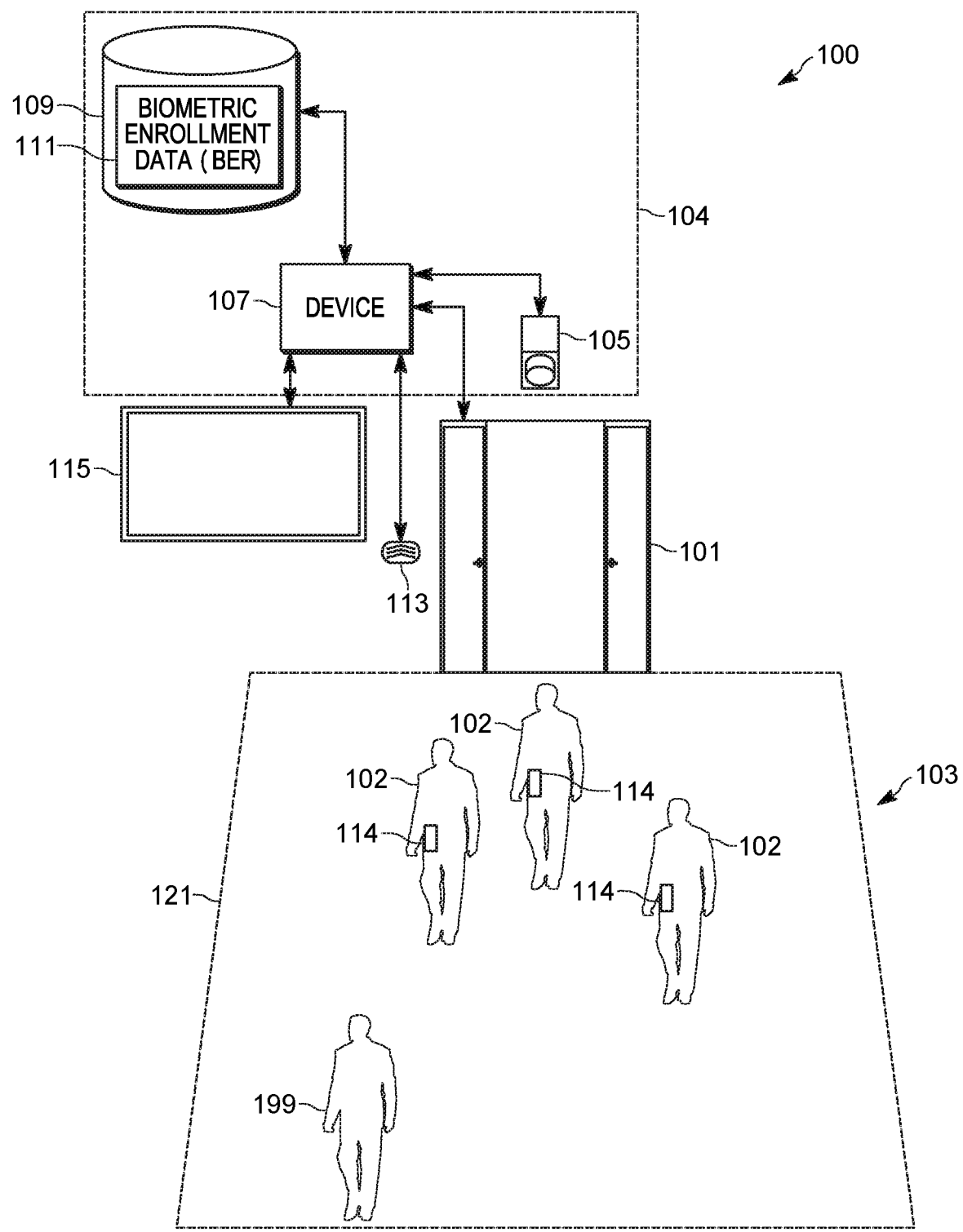
FIG. 1 is a system for controlling a passage barrier mechanism, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

At controlled-access points, passage barrier mechanisms may be maintained in a closed and locked state, and a user must positively swipe in, for example using an access card, wait for authentication to occur, wait for the mechanical lock to unlock, and then proceed through the controlled access point once authenticated. However, such mechanisms have low user throughput and further have problems with tailgating, in which users pass through the passage barrier mechanism following an authenticated user and without, themselves, being authenticated.

While, in some examples as described herein, a passage barrier mechanism may be left wide open (e.g. which may be referred to multiple-entry frictionless controlled access, and the like), with authentication on users performed using a camera, there is a still a technical problem of restricting passage therethrough by unauthorized users.

An aspect of the present specification provides a method comprising: while failing to detect, via a biometric imaging system in communication with a passage barrier mechanism, unauthorized users in a first area of interest of the biometric imaging system: maintaining a passage barrier mechanism in a multiple entry state in which multiple users at a time authenticate via the biometric imaging system and enter through the passage barrier mechanism; responsive to detecting, via the biometric imaging system, an unauthorized user in the first area of interest: transitioning the passage barrier mechanism from the multiple entry state to a single entry state in which only a single user at a time authenticates via the biometric imaging system and enters through the passage barrier mechanism; and changing a biometric authentication range of the biometric imaging system from the first area of interest to a second area of interest smaller than the first area of interest.

Another aspect of the present specification provides a device comprising: a controller in communication with a passage barrier mechanism, the controller configured to: while failing to detect, via a biometric imaging system, unauthorized users in a first area of interest of the biometric imaging system: maintain the passage barrier mechanism in a multiple entry state in which multiple users at a time authenticate via the biometric imaging system and enter through the passage barrier mechanism; responsive to detecting, via the biometric imaging system, an unauthorized user in the first area of interest: transition the passage barrier mechanism from the multiple entry state to a single entry state in which only a single user at a time authenticates via the biometric imaging system and enters through the passage barrier mechanism; and change a biometric authentication range of the biometric imaging system from the first area of interest to a second area of interest smaller than the first area of interest.

Attention is directed to FIG. 1, which depicts an example system 100 for controlling a passage barrier mechanism. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks.

The system 100 comprises a passage barrier mechanism 101 through which users 102, located in a controlled area 103, may pass when authorized, for example into a secure space. For example, the system 100 further comprises a biometric imaging system 104 that, as depicted, comprises a camera 105 (and the like), a computing device 107, and a database 109 (and/or a memory in communication with the computing device 107) storing biometric enrollment data 111 (labelled "BER" in FIG. 1) used to authenticate the users 102 based on images and/or biometric data, and the like, acquired via the camera 105. For example, the biometric enrollment data 111 may store biometric signatures and/or biometric data (e.g. one or more values that represent biometric data), and the like, of the users 102 extracted from previously acquired images of the users 102 (which may include, but is not limited to, video). While present examples are described with reference to facial recognition being used by the biometric imaging system 104 for authentication, any suitable biometric signatures and/or biometric data may be used to authenticate the users 102 including, but not limited to, facial landmarks, a gait of the users 102, an outline of the users 102, and the like.

The biometric imaging system 104 and/or the camera 105 is facing towards the controlled area 103, and acquires the images and/or biometric data from the controlled area 103, as described below. The images and/or biometric data used to authenticate the users 102 may be a first authentication factor of the system 100 used (alone, or in combination with other factors) to authorize the users 102 to enter through the passage barrier mechanism 101.

In some examples, the passage barrier mechanism 101 may comprise a door, a double door, a gate, a portal, an entrance, a turnstile, an exit, and the like through which passage is electronically controlled. The passage barrier mechanism 101 may be located at an entrance and/or an exit to a building, and the like, through which passage is electronically controlled. While the passage barrier mechanism 101 is depicted as a physical barrier mechanism, the passage barrier mechanism 101 may additionally and/or alternatively comprise any suitable non-physical barrier mechanism through which passage is controlled, for example, using electromagnetic fields, disorienting holograms, or another non-visible type of barrier mechanism that may be used prevent passage therethrough. In the depicted examples, the passage barrier mechanism 101 comprises physical double doors, and each of the double doors may be electronically locked, unlocked, opened and/or closed; in particular, when both double doors are open, multiple users 102 may enter and/or exit therethrough simultaneously.

As depicted, the system 100 may further comprise an authentication system 113, such as a card reader (as depicted), and the like, for example located adjacent the passage barrier mechanism 101 that may optionally be used as an additional factor to authenticate users 102 for passage through the passage barrier mechanism 101. As depicted the authentication system 113 is also in communication with the computing device 107 (which may comprise a cloud computing device), however in other examples, the system 100 may comprise another computing device of the authentication system 113 used to authorize users using an authentication factor associated with the authentication system 113. As depicted, the users 102 may carry cards 114, such as near field communication (NFC) cards, and/or access cards, and the like, that store data associated with a respective user 102 (e.g. such as an identification number), which may also be stored at the biometric enrollment data 111 and/or in association with the biometric enrollment data 111 and/or in a different database and/or memory (e.g. in communication with the device 107 and/or another computing device, for example in association with the respective user 102). A given user 102 may place a respective card 114 adjacent the authentication system 113, and the computing device 107 may read the data on the respective card 114 and compare data read from the respective card 114 with data stored in association with the biometric enrollment data 111 (and/or the given user 102), to authenticate the given user 102. The data of the cards 114 used to authenticate the users 102 may be a second authentication factor of the system 100, which may be used, for example in addition to biometric authentication, to authorize a user 102 to enter through the passage barrier mechanism 101.

While not depicted, the users 102 may also carry mobile devices which may store tokens for authentication and be configured to interact with the authentication system 113 (e.g. such mobile devices may include an NFC system, Bluetooth™ system, and the like) to authenticate the users 102 using such tokens. Such mobile devices may include display screens registered with the biometric imaging system 104.

Furthermore, while two authentication systems are depicted in the system 100, the system 100 may include more than two authentication systems including, but not limited to, the biometric imaging system 104 and one more additional authentication system which may include the authentication system 113 and/or another authentication system, including, but not limited to, a password entry system, a fingerprint reader system, a voice authentication system, an iris reader system, and the like.

As depicted, the system 100 further comprises a display screen 115 and/or any other suitable notification device (e.g. lights, speakers and the like) which may face facing in a direction viewable by the users 102 entering and/or approaching the passage barrier mechanism 101 and/or in substantially a same direction as the biometric imaging system 104 (e.g. facing in substantially a same direction as the camera 105). However such a display screen may be located in any suitable position such that users 102 exiting the passage barrier mechanism 101 may view such the display screen that may be used to provide notifications of a state of the passage barrier mechanism 101 and/or other information as described below. The display screen 115 may alternatively be referred to as an outward-facing display screen (e.g. the display screen 115 is facing in a direction viewable by the users 102 entering and/or approaching the passage barrier mechanism 101 from the controlled area 103 and/or the facing outward towards the controlled area 103).

While not depicted, in yet further examples, the system 100 may comprise a display screen facing into the space beyond the passage barrier mechanism 101, and/or located such that users 102 exiting the passage barrier mechanism 101 (e.g. into the controller area 103 from the passage barrier mechanism 101) may view such a display screen; such a display screen may be located at a side of the passage barrier mechanism 101 opposite that depicted in FIG. 1 (e.g. inside a secure space accessible via the passage barrier mechanism 101). However such a display screen may be located in any suitable position such that users 102 exiting the passage barrier mechanism 101 may view such the display screen. Such a display screen may alternatively be referred to as an inward-facing display screen (e.g. such a display screen is facing in a direction viewable by the users 102 exiting and/or approaching the passage barrier mechanism 101 from the secure space beyond the passage barrier mechanism 101, as depicted, and/or the facing inwardly towards the secure space).

Returning to the biometric imaging system 104 and the controlled area 103, the controlled area 103 may be divided into areas of interest of the biometric imaging system 104. The biometric imaging system 104 and/or the camera 105 faces the controlled area 103 and is generally configured to acquire images and/or biometric data of the users 102 when located in the controlled area 103. The biometric imaging system 104 and/or the camera 105 is generally associated with a biometric authentication range that may be controlled to be different areas of interest in the controlled area 103. For example, using the example of the camera 105, a biometric authentication range may be the same or different from a field-of-view of the camera 105. The camera 105 may acquire images according to the field-of-view, but a biometric authentication range may be smaller than the field-of-view such that a user 102 in the field-of-view may be authenticated but only when in the biometric authentication range. The biometric authentication range may be determined electronically as described below.

As depicted, the biometric authentication range comprises a first area of interest (AoI) 121 which may comprise a maximum field-of-view of the camera 105, and the like, and/or a defined area and/or a defined field-of-view of the camera 105 within which users 102 in the controlled area 103 are imaged and authorized. While as depicted the first AoI 121 is rectangular, the first AoI 121, and/or any biometric authentication range described herein, may be any suitable shape including, but not limited to, rectangular, square, circular, elliptical, cone-shaped, and the like. In general, the first AoI 121 is located adjacent the passage barrier mechanism 101 and/or extends from the passage barrier mechanism 101. As will be described below, the biometric authentication range may be changed, for example based on a state of the passage barrier mechanism 101. For example, the biometric authentication range may be changed to a smaller AoI that is also adjacent the passage barrier mechanism 101 and extends from the passage barrier mechanism 101; in such examples, the range of the camera 105 may not be changed, but only users 102 located in the smaller AoI are considered for authorization by the biometric imaging system 104. In some examples, such smaller AoIs are located within a largest AoI, such as the first AoI 121.

While present examples are described with respect to the biometric imaging system 104 comprising the camera 105, any suitable device that acquires images and/or biometric data may be used with the biometric imaging system 104. For example, the camera 105, and the like, may include, but is not limited to, a video camera, a still camera, a visual range imaging device, an infrared range imaging device, a radar device, a light detection and ranging (lidar) device, and the like. The biometric enrollment data 111 store images and/or biometric data (e.g. facial landmarks, infrared images and/or data, radar images and/or data, lidar images and/or data, and the like) that are commensurate with the images and/or biometric data acquired by the camera 105, and the like.

For example, the biometric enrollment data 111 may be generated and stored at the database 109 in a one-to-one basis with the users 102, using the camera 105 and/or a similar biometric imaging device (e.g. when the users 102 register with the biometric imaging system 104) such that the biometric enrollment data 111 may store respective images and/or biometric data of the users 102. Thereafter, images and/or biometric data of a user 102, acquired by the camera 105, and the like, may be compared, by the computing device 107, against the respective images and/or biometric data of the user 102 stored in the biometric enrollment data 111 to authorize the user 102 to pass through the passage barrier mechanism 101.

In particular, the biometric imaging system 104 and/or the computing device 107 is in communication with the passage barrier mechanism 101 and controls the passage barrier mechanism 101 to different states including, but not limited to, a multiple entry state, and a single entry state. In some example, the biometric imaging system 104 and/or the computing device 107 may control the passage barrier mechanism 101 to an open state, a closed state, an unlocked state, a locked state, and the like, as described hereafter, based on the images and/or biometric data, and the like, acquired the camera 105, and the biometric enrollment data 111. In particular, when the users 102 located in the first AoI 121 are all authorized the passage barrier mechanism 101 may be controlled to a multiple entry state in which the users 102 may enter through the passage barrier mechanism 101. For example, as depicted, doors of the passage barrier mechanism 101 are open and/or unlocked in the multiple entry state such that the users 102, as authenticated may pass therethrough in a multiple-entry "frictionless" manner (e.g. the multiple entry state may comprise a multiple-entry frictionless controlled access stage in which a plurality of users 102 may enter and/or exit, for example simultaneously).

However, as also depicted in FIG. 1, an unauthorized user 199 may subsequently enter the first AoI 121. The unauthorized user 199 may comprise a user who is not authorized to pass through the passage barrier mechanism 101. In some examples, the unauthorized user 199 may not be associated with biometric enrollment data 111 and the biometric imaging system 104 and/or the computing device 107 may determine that the user 199 is unauthorized by: acquiring an image and/or biometric data of the user 199 via the camera 105, and the like; searching for images and/or biometric data and/or biometric enrollment data 111 in the database 109 that match an acquired image and/or biometric data of the user 199; and, when no matching images and/or biometric data are found, and/or when no associated biometric enrollment data 111 is found, determine that the user 199 is unauthorized.

However, in other examples, the unauthorized user 199 may be associated with respective biometric enrollment data 111; for example, the user 199 may be on a blacklist, and the like, and/or a former employee, and the like for which a respective biometric enrollment data 111 was previously generated. In these examples, the biometric imaging system 104 and/or the computing device 107 may determine that the user 199 is unauthorized by: acquiring an image and/or biometric data of the user 199 via the camera 105, and the like; searching for images and/or biometric data and/or biometric enrollment data 111 in the database 109 that match an acquired image and/or biometric data of the user 199; and, when matching images and/or biometric data are found that are associated with the user 199 being unauthorized and/or on a blacklist, and/or when an associated respective biometric enrollment data 111 is found that is associated with the blacklist, determine that the user 199 is unauthorized.

In general, the user 199 may enter the first AoI 121 from an edge thereof, and as the first AoI 121 extends from the passage barrier mechanism 101, the user 199 may approach the passage barrier mechanism 101 by transiting through the first AoI 121. This may generally provide time for the biometric imaging system 104 and/or the computing device 107 to determine that the user 199 is unauthorized to pass through the passage barrier mechanism 101 and respond accordingly. For example, as described below, the biometric imaging system 104 and/or the computing device 107 may respond by: transitioning the passage barrier mechanism 101 from the multiple entry state to a single entry state in which only a single user 102 at a time authenticates via the biometric imaging system 104 and enters through the passage barrier mechanism 101; and changing a biometric authentication range of the biometric imaging system 104 from the first AoI 121 to a second AoI smaller than the first AoI 121. In such a manner, the biometric imaging system 104 and/or the computing device 107 may restrict and/or stop entry of the unauthorized user 199 through the passage barrier mechanism 101.

In yet further examples, the unauthorized user 199 may not be facing the camera 105 and/or their face may be obscured (e.g. the unauthorized user 199 may have their head down and/or wearing a hat and/or a mask). In these examples, the computing device 107 may determine that the user 199 is unauthorized as biometric data for authorizing the user 199 may not be acquired (and/or acquirable) by the biometric imaging system 104.

Figure 2:
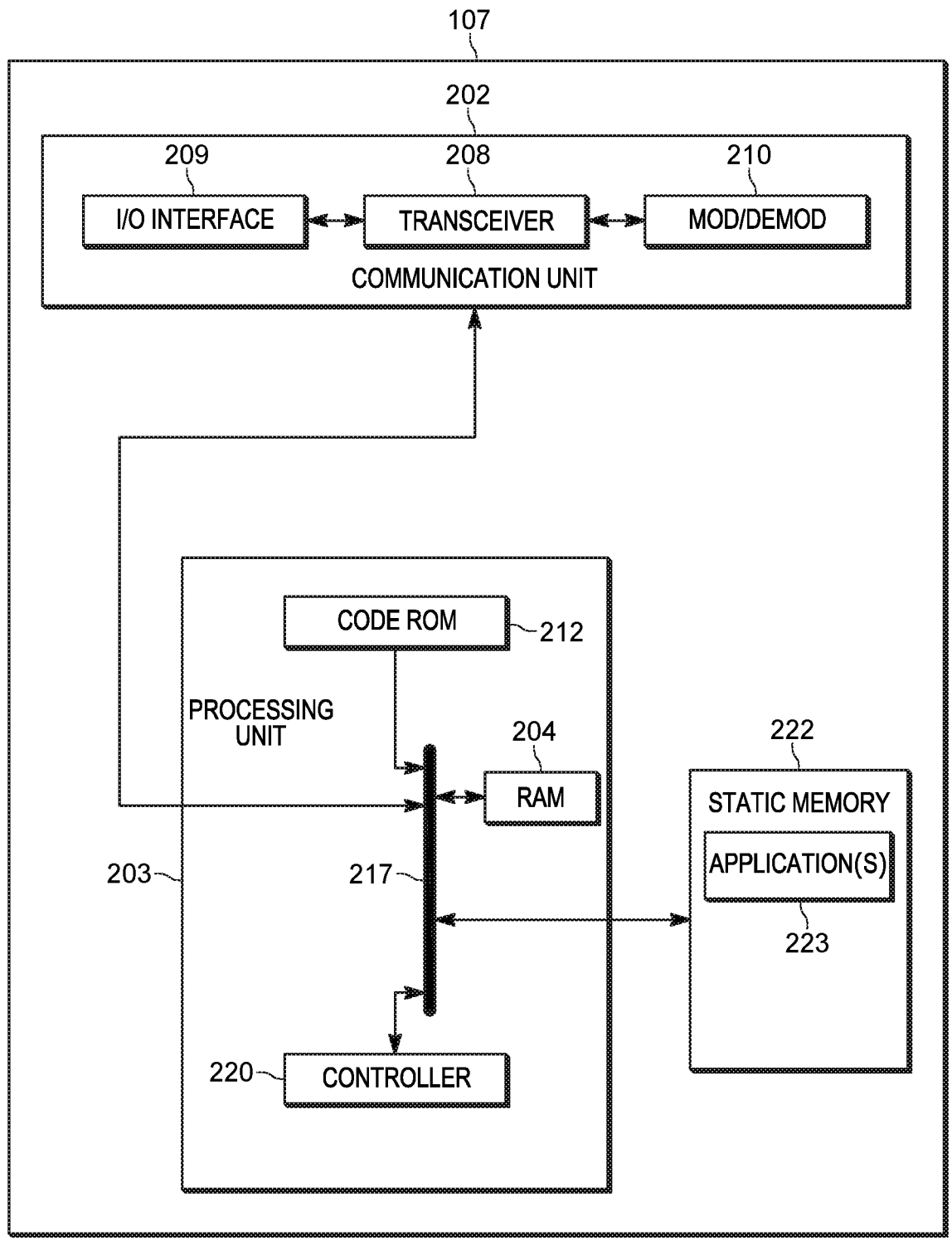
FIG. 2 is a device diagram showing a device structure of a device for controlling a passage barrier mechanism, in accordance with some examples.

Attention is next directed to FIG. 2 which depicts a schematic block diagram of an example of the computing device 107, interchangeably referred to hereafter as the device 107. In general, the device 107 may comprise one or more servers and/or one or more cloud computing devices, and the like, configured to communicate with the passage barrier mechanism 101, the camera 105, the database 109, and optionally the authentication system 113 and/or the display screen 115. However, the device 107 may comprise a computing device such as a personal computer and/or a laptop computer, and the like. In some examples, the device 107 may be combined with the camera 105 and/or any other suitable device of the system 100; for example, the biometric imaging system 104 and authentication system 113 may be combined and the device 107 may be combined with the card reader of the authentication system 113. The device 107 may be located local or remote from the passage barrier mechanism 101 and/or the other components of the system 100.

As depicted, the device 107 comprises: a communication unit 202, a processing unit 203, a Random-Access Memory (RAM) 204, one or more wireless transceivers 208 (which may be optional), one or more wired and/or wireless input/output (I/O) interfaces 209, a combined modulator/demodulator 210, a code Read Only Memory (ROM) 212, a common data and address bus 217, a controller 220, and a static memory 222 storing at least one application 223. Hereafter, the at least one application 223 will be interchangeably referred to as the application 223.

While not depicted, the device 107 may include one or more of an input device and a display screen and the like such that a user, such as a system administrator, and the like, may interact with the device 107.

As shown in FIG. 2, the device 107 includes the communication unit 202 communicatively coupled to the common data and address bus 217 of the processing unit 203.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communication unit 202 may include one or more wired and/or wireless input/output (I/O) interfaces 209 that are configurable to communicate with other components of the system 100 and/or the biometric imaging system 104. For example, the communication unit 202 may include one or more transceivers 208 and/or wireless transceivers for communicating with other components of the system 100 and/or the biometric imaging system 104. Hence, the one or more transceivers 208 may be adapted for communication with one or more communication links and/or communication networks used to communicate with the other components of the system 100 and/or the biometric imaging system 104. For example, the one or more transceivers 208 may be adapted for communication with one or more of the Internet, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) networks, a 5G network, a Citizens Broadband Radio Service (CBRS), Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a Bluetooth transceiver, a CBRS receiver, a Wi-Fi transceiver, a WiMAX transceiver, and/or another similar type of wireless transceiver configurable to communicate via a wireless radio network.

The communication unit 202 may optionally include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g. hardware ports) for coupling to other hardware components of the system 100 and/or the biometric imaging system 104.

The controller 220 includes one or more logic circuits, one or more processors, one or more microprocessors, one or more ASIC (application-specific integrated circuits) and one or more FPGA (field-programmable gate arrays), and/or another electronic device. In some examples, the controller 220 and/or the device 107 is not a generic controller and/or a generic device, but a device specifically configured to implement functionality for controlling a passage barrier mechanism. For example, in some examples, the device 107 and/or the controller 220 specifically comprises a computer executable engine configured to implement functionality for controlling a passage barrier mechanism.

The static memory 222 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the device 107 as described herein are maintained, persistently, at the memory 222 and used by the controller 220 which makes appropriate utilization of volatile storage during the execution of such programming instructions.

In illustrated examples, when the controller 220 executes the one or more applications 223, the controller 220 is enabled to: while failing to detect, via the biometric imaging system 104 in communication with the passage barrier mechanism 101, unauthorized users in a first AoI 121 of the biometric imaging system 104: maintain the passage barrier mechanism 101 in a multiple entry state in which multiple users 102 at a time authenticate via the biometric imaging system 104 and enter through the passage barrier mechanism 101; responsive to detecting, via the biometric imaging system 104, an unauthorized user 199 in the first AoI 121: transitioning the passage barrier mechanism 101 from the multiple entry state to a single entry state in which only a single user 102 at a time authenticates via the biometric imaging system 104 and enters through the passage barrier mechanism 101; and changing a biometric authentication range of the biometric imaging system from the first AoI 121 to a second AoI smaller than the first AoI 121.

The application 223 may include programmatic algorithms, and the like, to authorize users 102 and/or determine whether unauthorized users are in the first AoI 121, and the like.

Alternatively, the application 223 may include machine learning and/or deep-learning based algorithms and/or neural networks, and the like, which have been trained to authorize users 102 and/or determine whether unauthorized users are in the first AoI 121, and the like. Furthermore, in these examples, the application 223 may initially be operated by the controller 220 in a training mode to train the machine learning and/or deep-learning based algorithms and/or neural networks of the application 223 to authorize users 102 and/or determine whether unauthorized users are in the first AoI 121, and the like.

The one or more machine learning algorithms and/or deep learning algorithms and/or neural networks of the application 223 may include, but are not limited to: a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public-safety and/or security environments; the controlled area 103 may comprise such a public-safety and/or security environments. However, any suitable machine learning algorithm and/or deep learning algorithm and/or neural network is within the scope of present examples.

Figure 3:
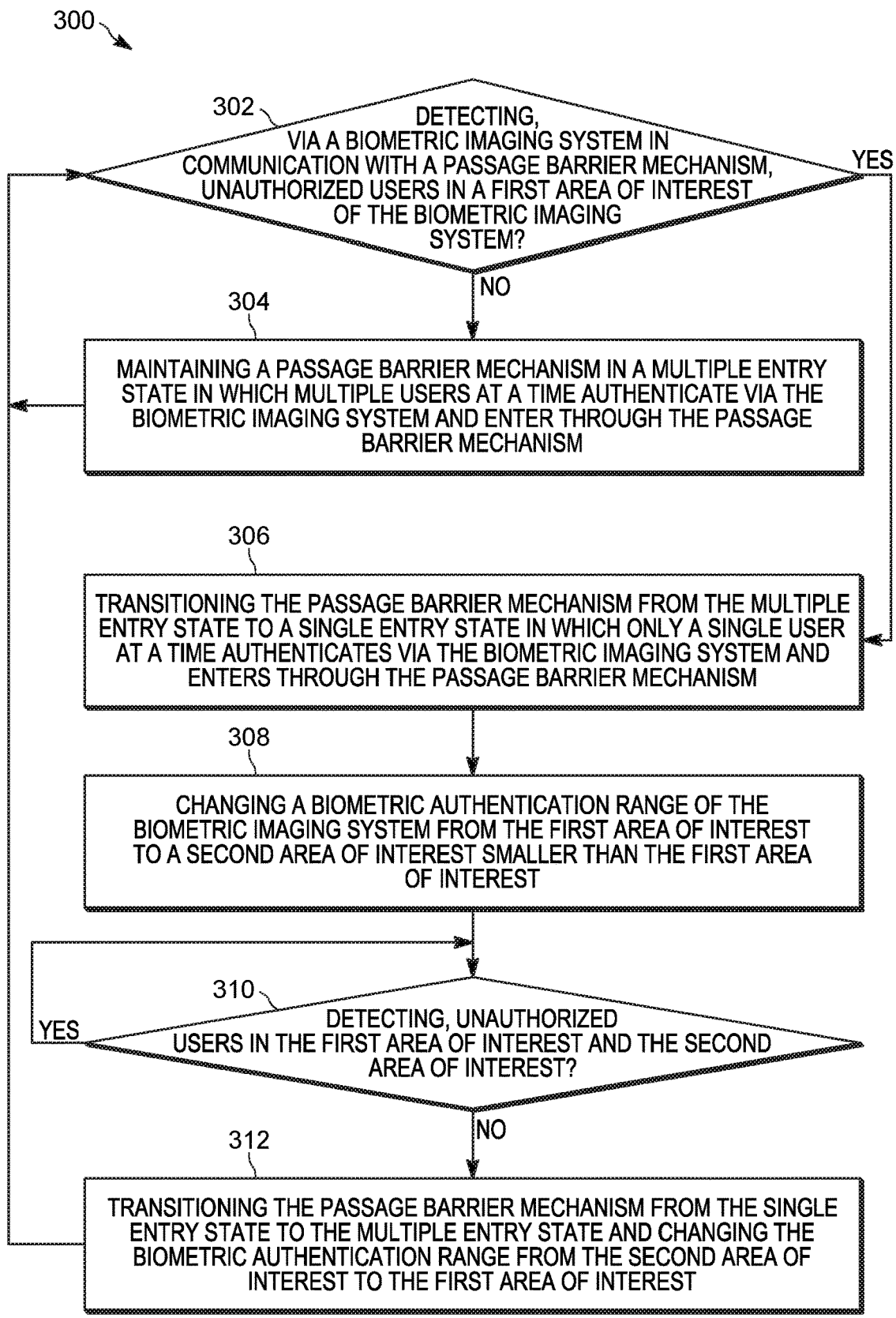
FIG. 3 is a flowchart of a method for controlling a passage barrier mechanism, in accordance with some examples.

Attention is now directed to FIG. 3 which depicts a flowchart representative of a method 300 for controlling a passage barrier mechanism. The operations of the method 300 of FIG. 3 correspond to machine readable instructions that are executed by the device 107, and specifically the controller 220 of the device 107. In the illustrated example, the instructions represented by the blocks of FIG. 3 are stored at the memory 222 for example, as the application 223. The method 300 of FIG. 3 is one way in which the controller 220 and/or the device 107 and/or the system 100 and/or the biometric imaging system 104 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 220 and/or the device 107 determines, via the biometric imaging system 104 in communication with a passage barrier mechanism 101, whether unauthorized users are detected in the first AoI 121 of the biometric imaging system 104. For example, as described above, images and/or biometric data of users in the first AoI 121 are acquired via the camera 105, and the like, and compared to data of the biometric enrollment data 111.

When matching images and/or biometric data of the users in the first AoI 121 are found in the biometric enrollment data 111, the controller 220 and/or the device 107 fails to detect unauthorized users in the first AoI 121 (e.g. a "NO" decision occurs at the block 302.

While failing to detect unauthorized users in the first AoI 121, at a block 304, the controller 220 and/or the device 107 maintains the passage barrier mechanism 101 in a multiple entry state in which multiple users 102 at a time authenticate via the biometric imaging system 104 and enter (and/or exit) through the passage barrier mechanism 101. For example, multiple entry state of the passage barrier mechanism 101 may comprise an open state and multiple users 102 at a time may be authenticated and pass through (including entering and/or exiting) the passage barrier mechanism 101 in the open state. As described above, such a multiple entry state may comprise a frictionless entry state.

The controller 220 and/or the device 107 continues to determine whether unauthorized users are detected in the first AoI 121 the block 302. As described above, when no matching images and/or biometric data of a user in the first AoI 121 are found in the biometric enrollment data 111, and/or matching images and/or biometric data of a user in the first AoI 121 are determined to be associated with a black list, at the block 302 controller 220 and/or the device 107 determines that an unauthorized user is in the first AoI 121 (e.g. a "YES" decision occurs at the block 302).

Responsive to detecting, via the biometric imaging system 104, an unauthorized user, such as the unauthorized user 199, in the first AoI 121, at a block 306, the controller 220 and/or the device 107 transitions the passage barrier mechanism 101 from the multiple entry state to a single entry state in which only a single user 102 at a time authenticates via the biometric imaging system 104 and enters through the passage barrier mechanism 101.

Also responsive to detecting, via the biometric imaging system 104, an unauthorized user in the first AoI 121, at a block 308, the controller 220 and/or the device 107 changes a biometric authentication range of the biometric imaging system from the first AoI 121 to a second AoI smaller than the first AoI 121. As described above, the first AoI 121 and the second AoI each include a region adjacent the passage barrier mechanism 101, however, the second AoI is generally smaller than the first AoI 121. For example, changing a biometric authentication range of the biometric imaging system from the first AoI 121 to a second AoI smaller than the first AoI 121 may include, but is not limited to: the second AoI being smaller and/or narrower in one or more of a horizontal field-of-view and a vertical field-of-view of the camera 105; controlling the camera 105 to pan, tilt, and/or zoom, and the like, into the second AoI from the first AoI 121; selecting a sub-region an acquired image of the camera 105; filtering an acquired image of the camera 105 for distance within the acquired image; and the like. In some examples the second AoI may be of a size that causes only one facial image, at a time, and/or biometric data of one user 102, to be acquired for authentication adjacent the passage barrier mechanism 101.

In some examples, the single entry state of the passage barrier mechanism 101 may comprise the passage barrier mechanism 101 being in one or more of a closed state and a locked state, for example until a user 102 is authenticated. Once a single user 102 is authenticated, the passage barrier mechanism 101 may be opened and/or unlocked until the single user 102 passes through the passage barrier mechanism 101 and the passage barrier mechanism 101 is again placed in the closed state and/or the locked state until a next user 102 is authenticated.

Put another way, in examples where the single entry state comprises the passage barrier mechanism 101 being in one or more of a closed state and a locked state, the controller 220 and/or the device 107 may: responsive to detecting, via the biometric imaging system 104, an authorized user in the second AoI, the second AoI being closer to the passage barrier mechanism 101 than the first AoI 121, temporarily transition the passage barrier mechanism 101 from one or more of the closed state and the locked state to one or more of an open state and an unlocked locked state while maintaining the passage barrier mechanism 101 in the single entry state In other examples, the single entry state of the passage barrier mechanism 101 may comprise the passage barrier mechanism 101 being placed in a state where only one user at a time may physically pass therethrough. For example, returning briefly to FIG. 1, the passage barrier mechanism 101 may comprise double doors where both doors are open in the multiple entry state. However, in the single entry state, only one of the doors may be opened and/or unlocked when a user 102 is authenticated.

In some examples in the single entry state of the passage barrier mechanism 101, the controller 220 and/or the device 107 may: authenticate a single user 102 using a first authentication factor determined via the biometric imaging system 104; authenticate the single user 102 using a second authentication factor determined via one or more of the biometric imaging system 104 and a second authentication system, including, but not limited to, the authentication system 113; and control the passage barrier mechanism 101 to allow the single user 102 to pass therethrough only after the single user 102 is authenticated using both the first authentication factor and the second authentication factor. Hence, for example, in the single entry state, a user 102 may be required to be authorized via the biometric imaging system 104, and via the authentication system 113. Put another way, in these examples, a user 102 may be authenticated at least twice before the passage barrier mechanism 101 is controlled to allow the user 102 to pass therethrough in the single-entry state. Furthermore, the two authentications may occur in any suitable order (e.g. authentication using the first authentication factor may occur before or after authentication using the first authentication factor).

Hence, in these examples, when the unauthorized user 199 attempts to pass through the passage barrier mechanism 101 without being authorized, the passage barrier mechanism 101 is in the single entry state and generally prevents passage therethrough to the unauthorized user 199.

In some examples, after transitioning the passage barrier mechanism 101 from the multiple entry state to the single entry state, at a block 310 the controller 220 and/or the device 107 may determine whether unauthorized users 199 are detected in the second AoI and/or the first AoI 121. When the unauthorized users 199 remain in the second AoI and/or the first AoI 121 (e.g. a "YES" decision occurs at the block 310), the controller 220 and/or the device 107 continues to determine (e.g. at the block 310) whether unauthorized users are in the second AoI and/or the first AoI 121. The passage barrier mechanism 101 remains in the single entry state and the biometric authentication range continues to be the second AoI such that users 102 are authenticated when in the second AoI but not the first AoI 121. In other words, the biometric imaging system 104 may continue to monitor whether users in the first AoI 121 are unauthenticated, but the users 102 may not be authenticated by the biometric imaging system 104 until located in the second AoI.

In some examples, after transitioning the passage barrier mechanism 101 from the multiple entry state to the single entry state, control of the passage barrier mechanism 101 by the controller 220 and/or the device 107 may depend on the controller 220 and/or the device 107 determining that an unauthorized user 199 is detected in the first AoI 121 or second AoI. In some examples, when the controller 220 and/or the device 107 determines that the unauthorized user 199 remains in the first AoI 121 (e.g. but is not in the second AOI), the controller 220 and/or the device 107 may control the passage barrier mechanism 101 to remain in the single entry mode. In yet further examples, when the controller 220 and/or the device 107 determines that the unauthorized user 199 remains in the second AoI, the controller 220 and/or the device 107 may lock the passage barrier mechanism 101 and/or transition the passage barrier mechanism 101 from the single entry state to a locked state; in some of these examples, when the controller 220 and/or the device 107 determines that the unauthorized user 199 remains in the second AoI for a given time period, the controller 220 and/or the device 107 may lock the passage barrier mechanism 101 and/or transition the passage barrier mechanism 101 from the single entry state to a locked state.

However, when the controller 220 and/or the device 107 determines that unauthorized users are no longer detected in the second AoI and/or the first AoI 121 (e.g. a "NO" decision occurs at the block 310), at a block 312, the controller 220 and/or the device 107 transitions the passage barrier mechanism 101 from the single entry state to the multiple entry state and changes the biometric range of the biometric imaging system 104 from the second AoI to the first AoI 121, and thereafter repeats the block 302.

Put another way, after transitioning the passage barrier mechanism 101 from the multiple entry state to the single entry state, responsive to subsequently failing to detect, via the biometric imaging system 104, the unauthorized user 199 in either of the first AoI 121 and the second AoI, the controller 220 and/or the device 107 transitions the passage barrier mechanism 101 from the single entry state to the multiple entry state.

While not depicted, in some examples of the method 300 may comprise, after transitioning the passage barrier mechanism 101 from the multiple entry state to the single entry state, the controller 220 and/or the device 107 detecting, via the biometric imaging system 104, the unauthorized user 199 in a third AoI of the biometric imaging system 104, the third AoI smaller than the second AoI and closer to the passage barrier mechanism 101 than the second AoI. For example, the third AoI may be directly in front of the of the passage barrier mechanism 101 such that the unauthorized user 199 may be directly in front of the passage barrier mechanism 101. In these examples, the controller 220 and/or the device 107 may, after transitioning the passage barrier mechanism 101 from the multiple entry state to the single entry state, responsive to detecting, via the biometric imaging system 104, the unauthorized user 199 in the third AoI, temporarily transition the passage barrier mechanism 101 from the single entry state to one or more of a closed state and a locked state in which no users may enter the passage barrier mechanism 101 (e.g. whether authorized or unauthorized). Hence, in these examples, the passage barrier mechanism 101 is closed and/or locked, for example until the unauthorized user 199 moves out of the third AoI back to the second AoI and/or back to the first AoI 121 and/or out of the first AoI 121.

The method 300 may further include the controller 220 and/or the device 107 controlling the display screen and/or any suitable notification device.

For example, the method 300 may further include the controller 220 and/or the device 107 controlling a notification device, facing in a direction viewable by the users 102 entering and/or approaching the passage barrier mechanism 101 in the first AOI 121, to provide a notification that the passage barrier mechanism 101 has transitioned from the multiple entry state to the single entry state. Such controlling of a notification device may include, but is not limited to, rendering, at the display screen 115 the notification, and/or controlling a light (e.g. from green to yellow and/or red and/or another suitable color) and/or controlling a speaker (e.g. to audibly emit a notification of the transition from the multiple entry state to the single entry state), and the like.

Similarly, the method 300 may further include the controller 220 and/or the device 107 controlling a notification device, facing in a direction viewable by users exiting and/or or approaching the passage barrier mechanism 101 from a side opposite that depicted in FIG. 1 (e.g. exiting the secure space through the passage barrier mechanism 101), to provide a notification that the passage barrier mechanism 101 has transitioned from the multiple entry state to the single entry state. Such controlling of a notification device may include, but is not limited to, rendering, at a display screen in the secure space, the notification, and/or controlling a light (e.g. from green to yellow and/or red and/or another suitable color) and/or controlling a speaker (e.g. to audibly emit a notification of the transition from the multiple entry state to the single entry state), and the like In other examples, the method 300 may further include the controller 220 and/or the device 107 rendering, at the display screen 115 (e.g. located in the controlled area 103 that includes the first AoI 121 and the second AoI), an image of the unauthorized user 199, for example as acquired by the camera 105. Similarly, the method 300 may further include the controller 220 and/or the device 107 rendering, at a display screen in the secure space (and/or an inwardly facing display screen), an image of the unauthorized user 199, for example as acquired by the camera 105.

In other examples, the method 300 may further include the controller 220 and/or the device 107 rendering, at the display screen 115, an indication that the biometric authentication range of the biometric imaging system 104 has become smaller. For example, the display screen 115 may be controlled to render text and/or graphics, and the like, indicating that the biometric authentication range of the biometric imaging system has become smaller.

In other examples, the method 300 may further include the controller 220 and/or the device 107 rendering, at the display screen 115, a live field-of-view of the biometric imaging system 104 with an overlaid indicator identifying the first AOI 121, the second AIO, and/or the third AoI. For example, when the camera 105 includes a video camera, the display screen 115 may be controlled to render a live video feed from the camera 105 showing the field-of-view of the camera 105, with graphics overlaid identifying (e.g. each of) the first AOI 121, the second AIO, and/or the third AoI. Any other suitable notifications and/or text and/or graphics rendered at the display screen 115 and/or another notification device, is within the scope of the present specification.

In yet further examples, the method 300 may further include the controller 220 and/or the device 107 rendering, at the display screen 115, a live field-of-view of the biometric imaging system 104 with the unauthorized user 199 highlighted therein, for example via an outline around the unauthorized user 199, and the like (e.g. any suitable highlighting of the unauthorized user 199 in a live field-of-view is within the scope of the present specification).

Furthermore, in some examples, the controller 220 and/or the device 107 may render the notifications and the like, as described above, at display screens of mobile devices of the users 102, for example by wirelessly transmitting commands to the mobile devices of the users 102 via the communication unit 202. In these examples, the unauthorized user 199 may hence not be made aware of detection of an unauthorized user by the controller 220 and/or the device 107.

Figure 4:
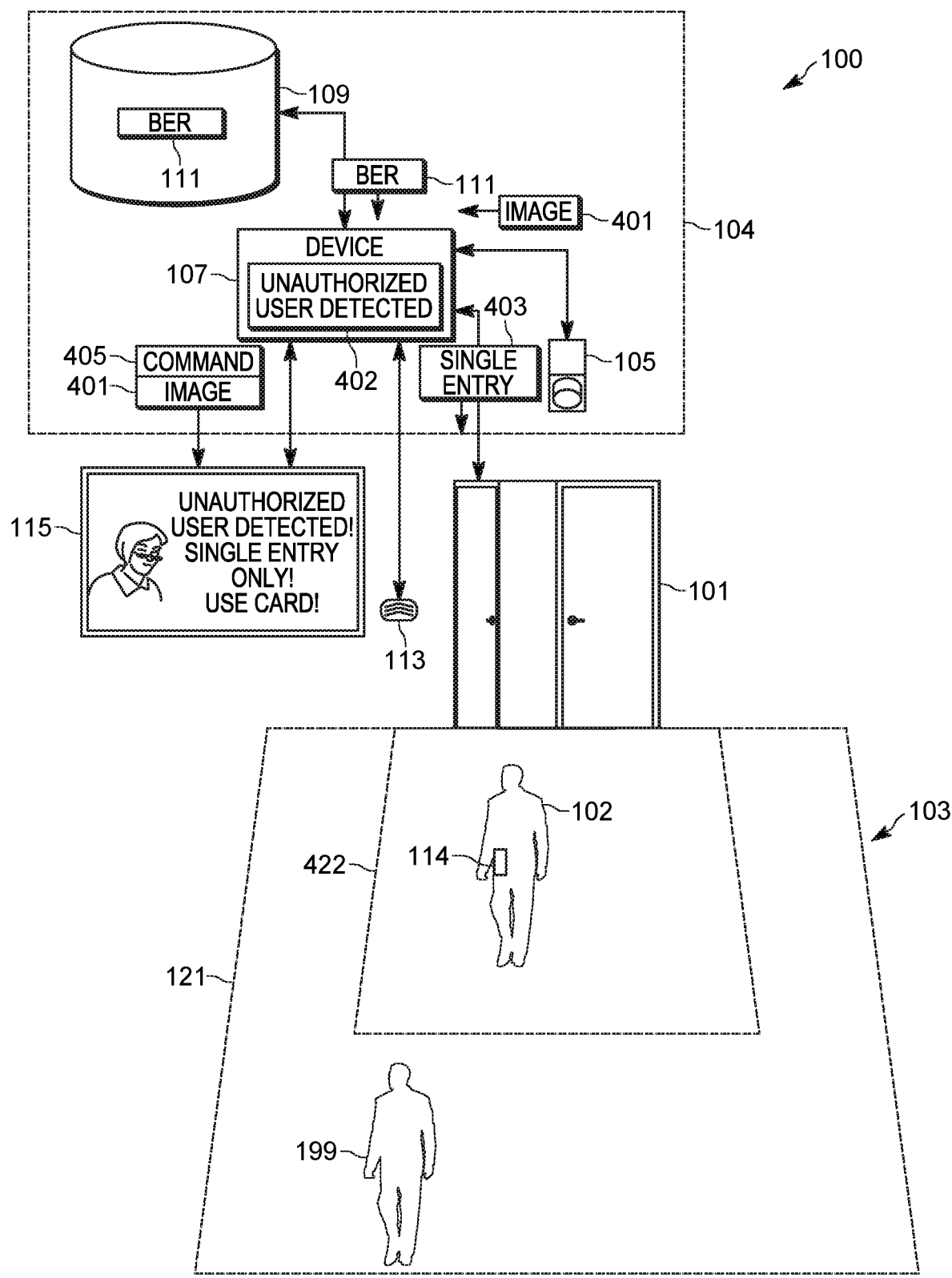
FIG. 4 depicts the system of FIG. 1 implementing a method for controlling a passage barrier mechanism, in accordance with some examples.

Attention is next directed to FIG. 4 which depicts an example of the method 300 and is substantially similar to FIG. 1 which like components having like numbers. In particular, in FIG. 4, most of the users 102 have passed through the passage barrier mechanism 101 and one user 102 remains in the first AoI 121. However, the biometric imaging system 104 has detected (e.g. at the block 302) the unauthorized user 199 in the first AoI 121. Specifically, as depicted, the device 107 receives an image 401 (which may include a live feed and/or a live video feed from the camera 105) which is understood to include an image of the face of the unauthorized user 199, and compares the image 401 with the biometric enrollment data 111. While FIG. 4 depicts the device 107 retrieving all the biometric enrollment data 111 from the database 109 for a comparison, the device 107 may use any suitable database lookup process, and the like, to determine whether the image 401 of the unauthorized user 199, and/or biometric data of the unauthorized user 199, is stored in the database 109. For example, biometric data (e.g. facial landmarks) of the unauthorized user 199 may not be stored at the database 109 and/or may be stored in association with a blacklist. Regardless, as depicted, the device 107 detects 402 (e.g. a "YES" decision occurs at the block 302) the unauthorized user 199.

In response to the device 107 detecting the unauthorized user 199, the device 107 controls (e.g. at the block 306) the passage barrier mechanism 101 to transition from the multiple entry state to a single entry state, for example by transmitting a command 403 to the passage barrier mechanism 101 to transition from the multiple entry state to a single entry state. For example, as depicted, one door of the passage barrier mechanism 101 mechanism closes and another door of the passage barrier mechanism 101 may remain partially open. However, in other examples, both doors of the passage barrier mechanism 101 may close and/or be locked until the user 102 is authenticated.

Also in response to the device 107 detecting the unauthorized user 199, the device 107 changes (e.g. at the block 308) a biometric authentication range of the biometric imaging system 104 from the first AoI 121 to a second AoI 422 smaller than the first AoI 121. While the first AoI 121 is depicted in FIG. 4 it is understood that, in some examples when the passage barrier mechanism 101 is in the single entry state, for a user 102 to be authenticated by the biometric imaging system 104, user 102 must be located in the second AoI 422.

As depicted, the device 107 also controls the display screen 115 (e.g. via a command 405 which includes the image 401) to render an image of the unauthorized user 199 and a notification that the passage barrier mechanism 101 has transitioned from the multiple entry state to the single entry state (e.g. as text rendered at the display screen 115; as depicted "Unauthorized User Detected! Single Entry Only! Use Card!").

In further examples, an inwardly facing display screen (e.g. facing in a direction viewable by users exiting and/or or approaching the passage barrier mechanism 101 from a side opposite that depicted in FIG. 1 (e.g. exiting the secure space through the passage barrier mechanism 101) may be controlled in a similar manner.

As depicted, the device 107 further enforces a multiple authentication factor process, and the display screen 115 is also controlled to provide a notification of the multiple authentication factor process. For example, as depicted, for the user 102 to be authenticated, the biometric imaging system 104 both authenticates the user 102, as described above, and the user 102 uses their card 114 with the authentication system 113.

While not depicted, when the user 199 leaves the second AoI 422 and the first AoI 121 (e.g. a "YES" decision occurs at the block 310), the device 107 transitions the passage barrier mechanism 101 back to the multiple entry state and changes the biometric authentication range from the second AoI 422 back to the first AoI 121.

While not depicted, in some examples, the device 107 may also transmit a notification to one or more devices of security personnel to alert them of the unauthorized user 199.

Figure 5:
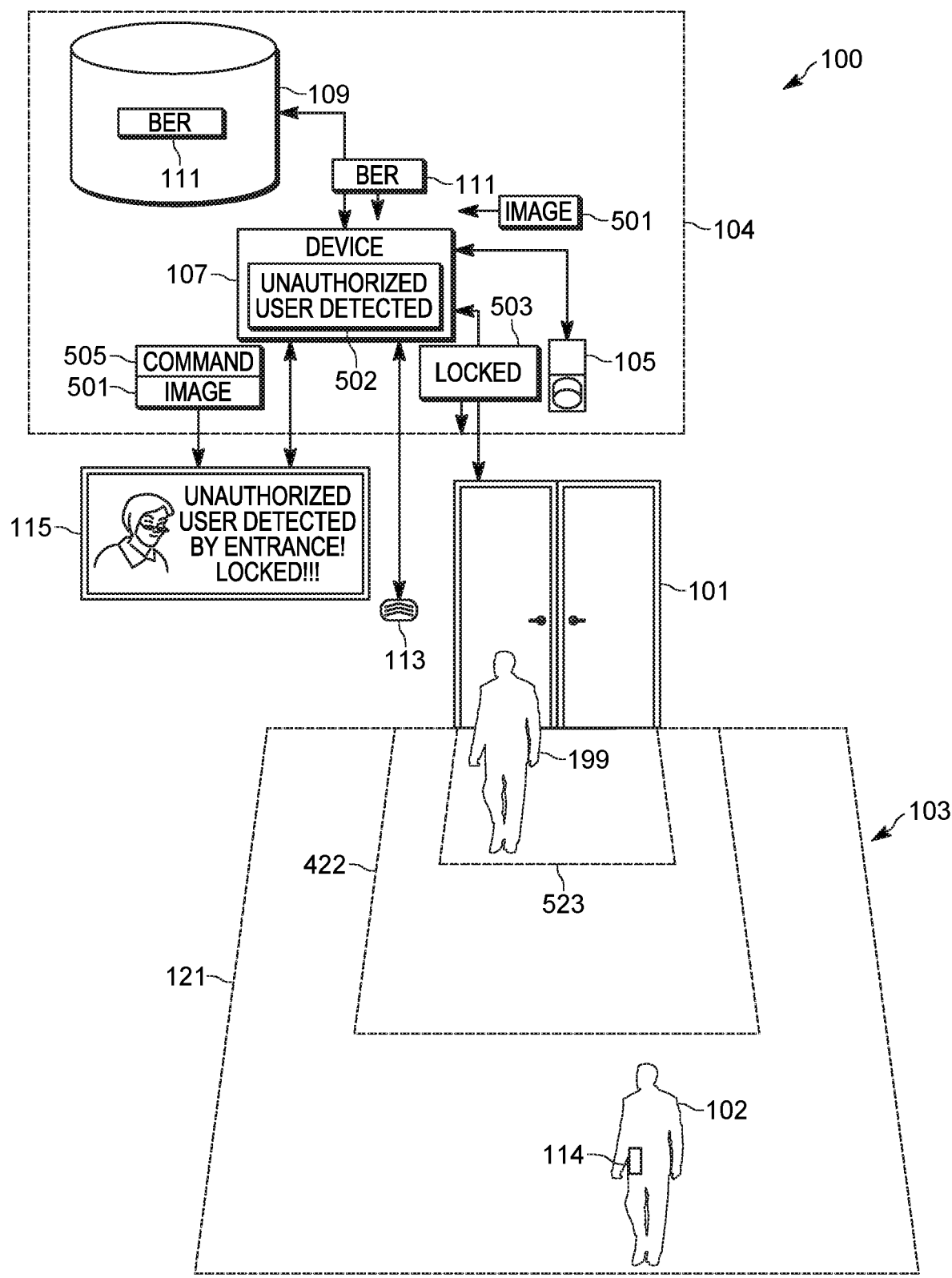
FIG. 5 depicts the system of FIG. 1 implementing another aspect of a method for controlling a passage barrier mechanism, in accordance with some examples.

Attention is next directed to FIG. 5 which depicts an example of the unauthorized user 199 approaching the passage barrier mechanism 101. FIG. 5 is substantially similar to FIG. 4 with like components having like numbers. However, in FIG. 5, the unauthorized user 199 has entered a third AoI 523 closer to the passage barrier mechanism 101 than the second AoI 422. The third AoI 523 is located within the second AoI 422 and also extends from the passage barrier mechanism 101. The biometric imaging system 104 continues acquire an image 501 of the unauthorized user 199 via the camera 105, and the device 107 continues to determine 502 that the unauthorized user 199 is detected (e.g. via the images 501 and the biometric enrollment data 111). The device 107 further determines that the unauthorized user 199 is in the third AoI 523 and responsively transmits a command 503 to the passage barrier mechanism 101 to control the passage barrier mechanism 101 to a locked state. Further, the device 107 transmits a command 505 (which includes the image 501) to the display screen 115 to control the display screen 115 to render the image 501 of the unauthorized user 199 and a notification that the passage barrier mechanism 101 is locked, for example due an unauthorized user being detected adjacent the passage barrier mechanism 101 (e.g. "Unauthorized User Detected By Entrance! LOCKED! ! !").

In further examples, an inwardly facing display screen (e.g. facing in a direction viewable by users exiting and/or or approaching the passage barrier mechanism 101 from a side opposite that depicted in FIG. 1 (e.g. exiting the secure space through the passage barrier mechanism 101) may be controlled in a similar manner.

While not depicted, in some examples, the device 107 may also transmit a notification to one or more devices of security personnel to alert them of the unauthorized user 199; such notifications may be transmitted as being urgent due to the unauthorized user 199 being located adjacent the passage barrier mechanism 101.

When the unauthorized user 199 leaves the third AoI 523 to the second AoI 422 and/or the first AoI 121, the device 107 may transition the passage barrier mechanism 101 to the single entry state and update the notification at the display screen 115 accordingly. When the unauthorized user 199 leaves the first AoI 121, the device 107 may transition the passage barrier mechanism 101 to the multiple entry state and update the notification at the display screen 115 accordingly.

In examples described herein where the passage barrier mechanism 101 is controlled to a single entry state and/or a locked state, the device 107 may control the passage barrier mechanism 101 to transition to the multiple entry state when an emergency is detected, including, but not limited to, detection of a fire alarm, an evacuation, and the like. Hence, in emergencies, the passage barrier mechanism 101 may be unlocked and/or passage therethrough may be unrestricted to allow for rapid exit of users therethrough.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method comprising:
    while failing to detect, via a biometric imaging system in communication with a passage barrier mechanism, unauthorized users in a first area of interest of the biometric imaging system: maintaining the passage barrier mechanism in a multiple entry state in which multiple users at a time authenticate via the biometric imaging system and enter through the passage barrier mechanism;
    responsive to detecting, via the biometric imaging system, an unauthorized user in the first area of interest:
        transitioning the passage barrier mechanism from the multiple entry state to a single entry state in which only a single user at a time authenticates via the biometric imaging system and enters through the passage barrier mechanism;
        changing a biometric authentication range of the biometric imaging system from the first area of interest to a second area of interest smaller than the first area of interest; and
    after transitioning the passage barrier mechanism from the multiple entry state to the single entry state, responsive to detecting, via the biometric imaging system, the unauthorized user in a third area of interest of the biometric imaging system, the third area of interest smaller than the second area of interest and closer to the passage barrier mechanism than the second area of interest, temporarily transitioning the passage barrier mechanism from the single entry state to one or more of a closed state and a locked state in which no users enter the passage barrier mechanism.

2. The method of claim 1, wherein the first area of interest and the second area of interest each include a region adjacent the passage barrier mechanism.

3. The method of claim 1, further comprising, in the single entry state of the passage barrier mechanism:
    authenticating the single user using a first authentication factor determined via the biometric imaging system;
    authenticating the single user using a second authentication factor determined via one or more of the biometric imaging system and a second authentication system; and
    controlling the passage barrier mechanism to allow the single user to pass therethrough only after the single user is authenticated using both the first authentication factor and the second authentication factor.

4. The method of claim 1, further comprising:
    after transitioning the passage barrier mechanism from the multiple entry state to the single entry state, responsive to subsequently failing to detect, via the biometric imaging system, the unauthorized user in either of the first area of interest and the second area of interest, transitioning the passage barrier mechanism from the single entry state to the multiple entry state.

5. The method of claim 1, wherein the single entry state further comprises the passage barrier mechanism being in one or more of a closed state and a locked state, the method further comprising:
    responsive to detecting, via the biometric imaging system, an authorized user in the second area of interest, the second area of interest being closer to the passage barrier mechanism than the first area of interest, temporarily transitioning the passage barrier mechanism from one or more of the closed state and the locked state to one or more of an open state and an unlocked locked state while maintaining the passage barrier mechanism in the single entry state.

6. The method of claim 1, further comprising:
    controlling a notification device, facing in a direction viewable by users entering and/or approaching the passage barrier mechanism, to provide a notification that the passage barrier mechanism has transitioned from the multiple entry state to the single entry state.

7. The method of claim 1, further comprising:
    rendering, at a display screen located in a controlled area that includes the first area of interest and the second area of interest, an image of the unauthorized user.

8. The method of claim 1, further comprising:
    rendering, at a display screen located in a controlled area that includes the first area of interest and the second area of interest, an indication that the biometric authentication range of the biometric imaging system has become smaller.

9. The method of claim 1, further comprising:
rendering, at a display screen located in a controlled area that includes the first area of interest and the second area of interest, a live field-of-view of the biometric imaging system with an overlaid indicator identifying the second area of interest.

10. A device comprising:
a controller in communication with a passage barrier mechanism, the controller configured to:
while failing to detect, via a biometric imaging system, unauthorized users in a first area of interest of the biometric imaging system: maintain the passage barrier mechanism in a multiple entry state in which multiple users at a time authenticate via the biometric imaging system and enter through the passage barrier mechanism;
responsive to detecting, via the biometric imaging system, an unauthorized user in the first area of interest:
transition the passage barrier mechanism from the multiple entry state to a single entry state in which only a single user at a time authenticates via the biometric imaging system and enters through the passage barrier mechanism;
change a biometric authentication range of the biometric imaging system from the first area of interest to a second area of interest smaller than the first area of interest; and
after transitioning the passage barrier mechanism from the multiple entry state to the single entry state, responsive to detecting, via the biometric imaging system, the unauthorized user in a third area of interest of the biometric imaging system, the third area of interest smaller than the second area of interest and closer to the passage barrier mechanism than the second area of interest, temporarily transition the passage barrier mechanism from the single entry state to one or more of a closed state and a locked state in which no users enter the passage barrier mechanism.

11. The device of claim 10, wherein the first area of interest and the second area of interest each include a region adjacent the passage barrier mechanism.

12. The device of claim 10, wherein the controller is further configured to, in the single entry state of the passage barrier mechanism:
authenticate the single user using a first authentication factor determined via the biometric imaging system;
authenticate the single user using a second authentication factor determined via one or more of the biometric imaging system and a second authentication system; and
control the passage barrier mechanism to allow the single user to pass therethrough only after the single user is authenticated using both the first authentication factor and the second authentication factor.

13. The device of claim 10, wherein the controller is further configured to:
after transitioning the passage barrier mechanism from the multiple entry state to the single entry state, responsive to subsequently failing to detect, via the biometric imaging system, the unauthorized user in either of the first area of interest and the second area of interest, transition the passage barrier mechanism from the single entry state to the multiple entry state.

14. The device of claim 10, wherein the single entry state further comprises the passage barrier mechanism being in one or more of a closed state and a locked state, and the controller is further configured to:
responsive to detecting, via the biometric imaging system, an authorized user in the second area of interest, the second area of interest being closer to the passage barrier mechanism than the first area of interest, temporarily transition the passage barrier mechanism from one or more of the closed state and the locked state to one or more of an open state and an unlocked locked state while maintaining the passage barrier mechanism in the single entry state.

15. The device of claim 10, wherein the controller is further configured to:
control a notification device, facing in a direction viewable by users entering and/or approaching the passage barrier mechanism, to provide a notification that the passage barrier mechanism has transitioned from the multiple entry state to the single entry state.

16. The device of claim 10, wherein the controller is further configured to:
render, at a display screen located in a controlled area that includes the first area of interest and the second area of interest, an image of the unauthorized user.

17. The device of claim 10, wherein the controller is further configured to:
render, at a display screen located in a controlled area that includes the first area of interest and the second area of interest, an indication that the biometric authentication range of the biometric imaging system has become smaller.

18. The device of claim 10, wherein the controller is further configured to:
render, at a display screen located in a controlled area that includes the first area of interest and the second area of interest, a live field-of-view of the biometric imaging system with an overlaid indicator identifying the second area of interest.

* * * * *